United States Patent
Settouti et al.

(10) Patent No.: US 10,711,935 B2
(45) Date of Patent: Jul. 14, 2020

(54) METHOD FOR MANAGING THE HEATING OF FLUIDS FLOWING THROUGH A NETWORK OF SUBMARINE PIPELINES

(71) Applicant: SAIPEM S.A., Montigny le Bretonneux (FR)

(72) Inventors: Narimane Settouti, Paris (FR); Philippe Muguerra, Saint Cyr l'Ecole (FR); Damien Spudic, Rueil-Malmaison (FR)

(73) Assignee: Saipem S.A., Montigny le Bretonneux (FR)

( * ) Notice: Subject to any disclaimer, the term of this patent is extended or adjusted under 35 U.S.C. 154(b) by 412 days.

(21) Appl. No.: 15/523,215

(22) PCT Filed: Oct. 29, 2015

(86) PCT No.: PCT/FR2015/052918
§ 371 (c)(1),
(2) Date: Apr. 28, 2017

(87) PCT Pub. No.: WO2016/066967
PCT Pub. Date: May 6, 2016

(65) Prior Publication Data
US 2017/0336010 A1 Nov. 23, 2017

(30) Foreign Application Priority Data
Oct. 31, 2014 (FR) .................... 14 60507

(51) Int. Cl.
*H05B 6/10* (2006.01)
*F16L 53/34* (2018.01)
*E21B 43/017* (2006.01)
*E21B 36/00* (2006.01)
*E21B 41/02* (2006.01)

(52) U.S. Cl.
CPC .............. *F16L 53/34* (2018.01); *E21B 36/00* (2013.01); *E21B 41/02* (2013.01); *E21B 43/017* (2013.01)

(58) Field of Classification Search
CPC ........ E21B 36/00; E21B 43/01; E21B 43/017; E21B 41/02; F16L 53/00; F16L 53/004; F16L 53/32; F16L 53/34
USPC ........ 219/628, 629, 630; 166/302, 335, 338, 166/366
See application file for complete search history.

(56) References Cited

U.S. PATENT DOCUMENTS

| | | | |
|---|---|---|---|
| 3,735,769 A * | 5/1973 | Miller | .................... F17D 1/084 137/13 |
| 5,027,842 A | 7/1991 | Powers | |
| 6,371,693 B1 | 4/2002 | Kipp et al. | |
| 2012/0031621 A1 | 2/2012 | Fowler | |

(Continued)

OTHER PUBLICATIONS

M-K Decrin et al. "Innovative flow assurance strategies for long tie-back developments in deep waters" XP055200799 Dec. 2, 2010, pp. 1-11.

*Primary Examiner* — Hung D Nguyen
(74) *Attorney, Agent, or Firm* — Cozen O'Connor (57) ABSTRACT

A method of managing the heating of fluids flowing in an undersea pipe network (2-1) providing a connection between a surface installation (6) and at least one undersea production well (4). The method releasably connecting at least one fluid heater station (14a, 14b) to an undersea pipe and controlling the heater station as a function of the mode of operation of the pipe network.

6 Claims, 8 Drawing Sheets

(56) References Cited

U.S. PATENT DOCUMENTS

2013/0098625 A1  4/2013  Hickman
2013/0220996 A1  8/2013  Liney
2014/0305613 A1  10/2014  Barendregt et al.

* cited by examiner

METHOD FOR MANAGING THE HEATING OF FLUIDS FLOWING THROUGH A NETWORK OF SUBMARINE PIPELINES

PRIORITY CLAIM

This is a U.S. national stage of application No. PCT/FR2015/052918, filed on Oct. 29, 2015. Priority is claimed on France Application No.: FR 1460507, filed Oct. 31, 2014, the content of which is incorporated here by reference.

BACKGROUND OF THE INVENTION

The present invention relates to the general field of undersea pipes resting on the sea bottom and providing a connection between undersea wells for producing hydrocarbons, in particular oil and gas, and a surface installation, e.g. a floating, production, storage, and off-loading unit.

In a given off-shore hydrocarbon production field, it is common practice to work a plurality of wells that may be spaced apart from one another by several kilometers or even tens of kilometers. The fluids coming from these various wells need to be collected by undersea pipes resting on the sea bottom and transferred via bottom-to-surface connection pipes to a surface installation, e.g. a ship or a shore collection point for collecting and storing them (and possibly processing them).

Furthermore, because the fluids (oil and gas) from the undersea hydrocarbon production wells are extracted at great depth in the subsoil, they leave the wells at a temperature that is relatively high at the level of the sea bottom (typically of the order of 70° C.). Since sea water is generally cold, particularly at great depths where it is typically at 4° C., if no arrangements are made for conserving the temperature of the fluids leaving production wells, they will cool progressively while traveling along the kilometers of undersea pipes. Unfortunately, those fluids contain various chemical compounds for which cooling leads to phenomena appearing that are impediments to maintaining good flow conditions.

Thus, molecules of gas, in particular of methane, combine with molecules of water to form hydrate crystals under certain conditions of pressure and temperature. These crystals can stick to the walls, where they collect together and lead to the formation of plugs capable of blocking the undersea pipe. Likewise, the solubility in oil of high molecular weight compounds, such as paraffins or asphaltenes, decreases with lowering temperature, thereby giving rise to solid deposits that are likewise capable of blocking the undersea pipe.

One of the known solutions for attempting to remedy those problems consists in thermally insulating undersea pipes in order to conserve as much as possible the initial heat of the fluids being transported. Several technologies are available for this purpose, including for example making use of coaxial pipes comprising an inner pipe conveying the fluids and an outer pipe coaxial with the inner pipe and in contact with the undersea medium, the annular space between the inner and outer pipes being filled with a thermally insulating material or else being evacuated.

Nevertheless, that solution of thermally insulating undersea pipes can at best only slow down the inevitable cooling of the fluids being transported. In particular, if the distance to be traveled at the bottom of the water is too great, or if the flow rate of the fluid is slowed or even stopped for a certain length of time, then the temperature of the fluids can drop below a critical threshold.

Another known solution for avoiding the formation of plugs in undersea pipes consists in cleaning them frequently by causing scrapers (also known as "pigs") to travel inside them and remove any deposits from the walls.

Nevertheless, in order to avoid any risk of a scraper jamming in the pipe, scraping an undersea pipe can at best eliminate only deposits that are of relatively modest sizes. Furthermore, in spite of having recourse to scraping, that solution still requires the pipes to be thermally insulated in order to limit as much as possible the formation of solid deposits inside them.

Another known solution consists in heating undersea pipes over their entire length by one or more electric cables that are wound around the pipes to heat them by the Joule effect. That solution is referred to as heat tracing and serves to keep the fluids transported in undersea pipes at a temperature higher than a critical threshold over their entire path from the production well to the surface installation.

That solution presents manifest problems associated with installing such electric heater cables over the entire length of the undersea pipes, with the high costs that are involved in terms of installation. Furthermore, heat tracing is based on continuity of the installation all along the undersea pipes. Unfortunately, if such continuity should be interrupted for any reason at a particular location in the pipes, then the entire installation is put out of service. This constraint thus makes it necessary to consider that type of heating only during so-called "preservation" stages for preserving the transported fluids, and not for operational stages.

OBJECT AND SUMMARY OF THE INVENTION

A main object of the present invention is thus to propose a method of managing the heating of fluids flowing in an undersea pipe network, without presenting the above-mentioned drawbacks.

This object is achieved by a method of managing the heating of fluids flowing in an undersea pipe network providing a connection between a surface installation and at least one undersea production well, method comprising, in accordance with the invention, releasably connecting at least one fluid heater station to an undersea pipe and controlling said heater station as a function of the mode of operation of the pipe network.

The method of the invention is remarkable in that it provides local management of the heating of transported fluids by one or more removable heater stations that are activated only when the situation requires them to be activated. These heater stations are local and can be positioned at one or more strategic points of the undersea pipe network in order to ensure that the transported fluids have a temperature level that is sufficient over a very great length.

By way of example, in an undersea pipe network having a length of 80 kilometers (km), and when managing heating under conditions that require continuous heating of the pipes during a normal operation stage, the heater stations may be connected at intervals of about once every 30 km along the pipes. Likewise, the method of the invention can be used at the bottom of a riser pipe (i.e. a pipe used for connecting the bottom of the sea with an installation at the surface) for fields that are ultra-deep (depth greater than 2000 meters (m)) in which the temperature of the transported fluids decreases very greatly as a result of the Joule Thomson expansion to which they are subjected (10° C. every 1000 m). In this application, the heating of the invention makes it possible to deliver the heat energy that is lost as the fluid moves upwards.

Furthermore, the heater stations in the method of the invention are entirely removable and can thus easily be disconnected from the undersea pipes in order to be taken to some other location in the pipe network or in order to be subjected to a maintenance or repair operation. The heater stations can also be incorporated in existing pipe networks since connecting them to an undersea pipe does not require major modification of the network. In the event of a heater station failing, the remainder of the operating line is unaffected (the other heater stations are not put out of operation).

The method of the invention for managing the heating of fluids thus presents great ease of installation on a pipe network (these heater stations are removable and independent of one another), very great flexibility in use (they can be used during a normal production stage, during a fluid preservation stage, etc.), and low installation and maintenance costs. The method of the invention also makes it possible to transfer the fluid heating that is usually to be found on the surface installation so as to position it under the sea, thereby saving space on board the surface installation.

In an implementation in which the undersea pipe network comprises:
  two main pipes connected together at the sea bottom and each connected to a surface installation so as to form at least one fluid circulation loop; and
  a plurality of secondary pipes connecting production wells to the two secondary pipes;
the method may comprise connecting each main pipe to at least one fluid heater station downstream from the secondary pipes, and activating the heater stations in a stage of normal operation of the pipe network in order to maintain the fluids at all points of the network at a temperature higher than a predetermined temperature threshold.

In this "conventional" loop implementation, the heater stations serve during a normal operation stage to ensure that the transported fluids over a very great length have a temperature level that is sufficient to avoid forming deposits in the undersea pipes. By way of example, a single heater station per main pipe suffices to ensure a temperature level that is sufficient at all points of an 80 km loop (total length of the main pipes).

Still in this implementation, in a preservation stage of the pipe network, the method advantageously comprises closing the secondary pipes, injecting a processed fluid into the main pipes in order to purge the main pipes of the fluid they contain, and stopping the heater stations once the main pipes are purged.

During a preservation stage, the processed fluid, which is typically gasoil stored in the surface installation, is injected into the loop formed by the main pipes that are isolated from the secondary pipes in order to purge the main pipes of any fluids coming from the production well. Unlike the fluids coming from the production well, the processed fluid that is injected into the loop does not lead to deposits being formed in the pipes at temperatures as low as those to be found at the bottom of the sea. Thus, once they have been purged of all fluids coming from the production well, the heater stations may be stopped.

In a stage of restarting the pipe network following a preservation stage, the method comprises reactivating the heater stations while keeping closed the secondary pipes so as to heat the main pipes, and subsequently reopening the secondary pipes progressively in order to restart production.

This restarting stage typically takes place after a stage of preserving the pipe network. Once the heater stations have been reactivated, the secondary pipes are progressively reopened in order to enable production to restart.

In a variant implementation, in which the undersea pipe network further includes two connection pipes connecting together the two main pipes downstream from the heater stations, the method may comprise, in a preservation stage of the undersea pipe network:
  closing the secondary pipes and the main pipes between the two connection pipes while opening the connection pipes, and activating the heater stations in order to maintain the fluids at all points in an upstream fluid circulation loop at a temperature higher than a predetermined temperature threshold; and
  injecting a processed fluid into the main pipes of a downstream fluid circulation loop in order to purge the fluids it contains.

In this variant implementation, referred to as a "two" loop implementation, the heater stations make it possible during a normal stage of operation to ensure that the fluids being transported over a very great length maintain a temperature level that is sufficient to avoid forming deposits in the undersea pipes.

Furthermore, in a preservation stage, the processed fluid is injected into the downstream loop in order to purge from the main pipes all fluids coming from the production well and thus avoid any formation of deposits in the downstream loop. In the upstream loop, the activated heater stations continue to heat the transported fluids in order to prevent them freezing by becoming cold. Compared with the above-described implementation, only one loop is purged of the fluids it contains, thereby limiting the quantity of processed fluid that is needed. This configuration thus makes it possible to simplify connection to an existing surface installation in which it is generally difficult to make modifications.

Still in this "two" loop variant implementation, in a stage of restarting the undersea pipe network following a preservation stage, the method may comprise:
  stopping injection of a processed fluid into the main pipes of the downstream fluid circulation loop;
  reopening the main pipes between the connection pipes;
  closing the two connection pipes so as to merge together the upstream and downstream fluid circulation loops;
  injecting methanol into at least one of the connection pipes in order to prevent hydrates forming therein; and
  reopening the secondary pipes progressively in order to restart production.

In another "two" loop variant implementation, in a stage of preserving the undersea pipe network, the method may comprise stopping the heater stations and depressurizing the upstream fluid circulation loop in order to avoid hydrates forming in the upstream loop.

In another "two" loop variant implementation, the undersea pipe loop may further comprise:
  two connection pipes connecting together the two main pipes downstream from the heater stations;
  two additional heater stations connected to the two main pipes downstream from the connection pipes; and
  two additional connection pipes connecting together the two main pipes downstream from the additional heater stations;
the method comprising, in a preservation stage:
  closing the secondary pipes;
  closing the main pipes between the two connection pipes and the two additional connection pipes while opening the connection pipes in order to form two circulation loops for the transported fluids;
  deactivating the heater stations and the additional heater stations and depressurizing the two fluid circulation loops in order to avoid hydrates forming therein; and injecting a processed fluid into the main pipes in a riser loop downstream from the two fluid circulation loops in order to purge them of the fluids they contain.

In another variant, in a stage of restarting the network of undersea pipes following a preservation stage, the method may comprise:

stopping injection of a processed fluid into the main pipes of the riser loop;

reopening the main pipes between the connection pipes and between the additional connection pipes;

closing the connection pipes and the additional connection pipes in order to merge together the two fluid circulation loops and the riser loop;

injecting methanol into the connection pipes and the additional connection pipes in order to prevent hydrates forming therein; and reopening the secondary pipes progressively in order to restart production.

In yet another variant implementation referred to as a "hybrid" loop implementation, the undersea pipe network comprises:

a production pipe connected to the surface installation;

a plurality of secondary pipes connecting production wells to the production pipe; and a service pipe connected to the production pipe downstream from the secondary pipes;

the method comprising connecting the production pipe to at least one fluid heater station downstream from a connection with the service pipe, and activating the heater station in a stage of normal operation of the pipe network in order to maintain the fluids at all points in the network at a temperature higher than a predetermined temperature threshold.

Whatever the implementation, the heater station may be connected to an undersea pipe directly or by means of a bypass pipe that is connected to the undersea pipe.

Likewise, at least one of the undersea pipes may be connected to at least one heater station. In order to improve the availability of the production line, it is possible to create redundancy with at least one of the undersea pipes that is connected to at least two heater stations installed in series or in parallel. With such redundancy, a heater station is capable on its own of providing the desired heating. Under normal circumstances, only one of the two heater stations is used, or else both of them are used at half-power. If one of the heater stations is withdrawn, the other takes over.

BRIEF DESCRIPTION OF THE DRAWINGS

Other characteristics and advantages of the present invention appear from the following description given with reference to the accompanying drawings, which show embodiments having no limiting character. In the figures.

DETAILED DESCRIPTION OF THE INVENTION

Figure 1A:
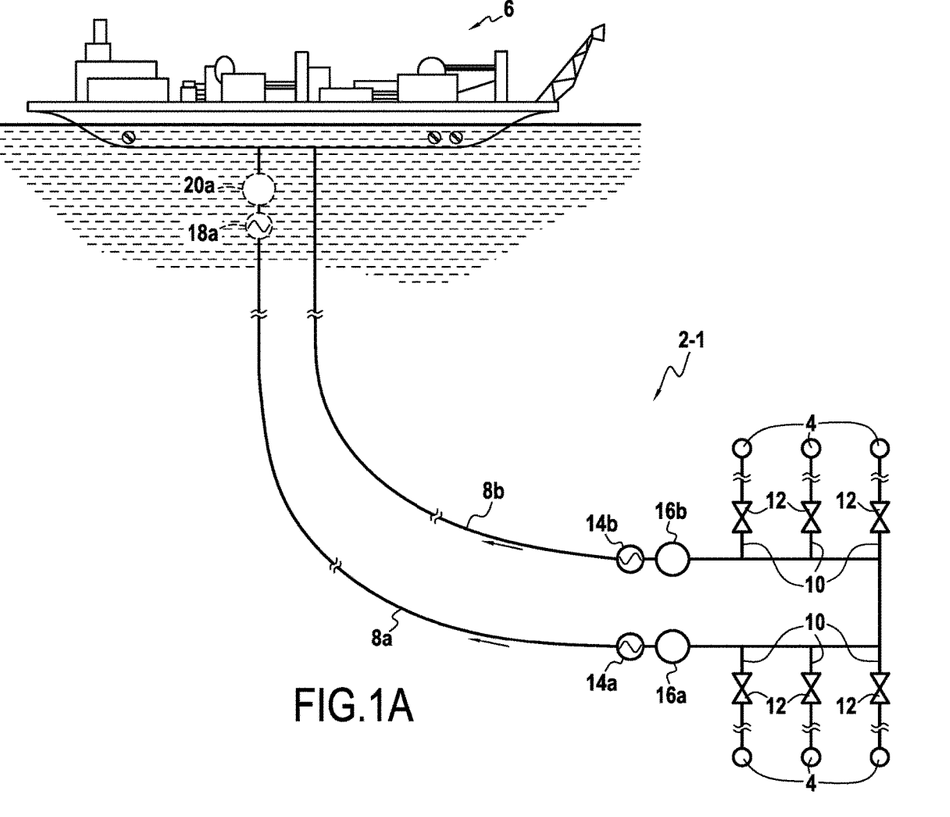
FIGS. 1A to 1C are diagrammatic views of an implementation of the method of the invention in a "one" loop first embodiment.
Figure 1B:
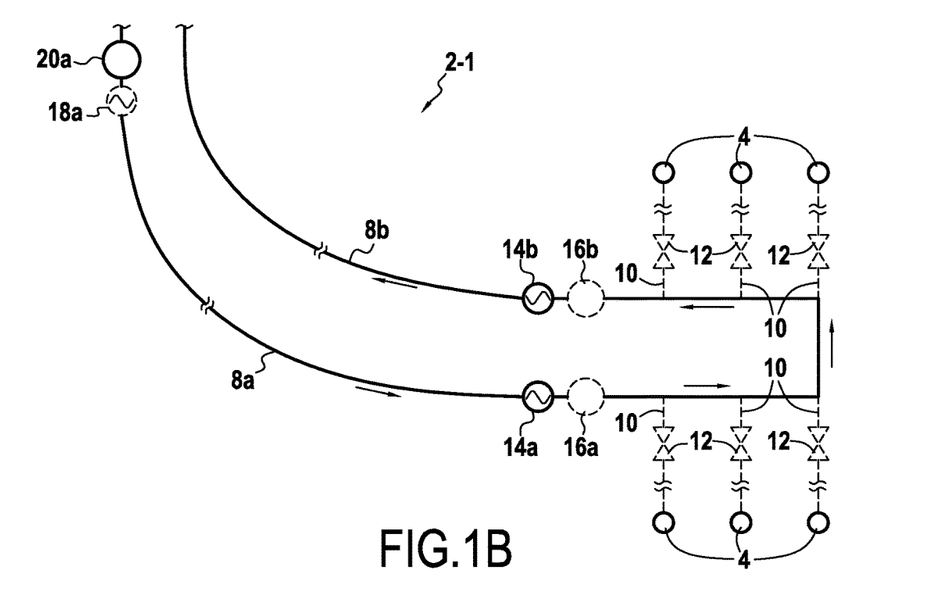
Figure 1C:
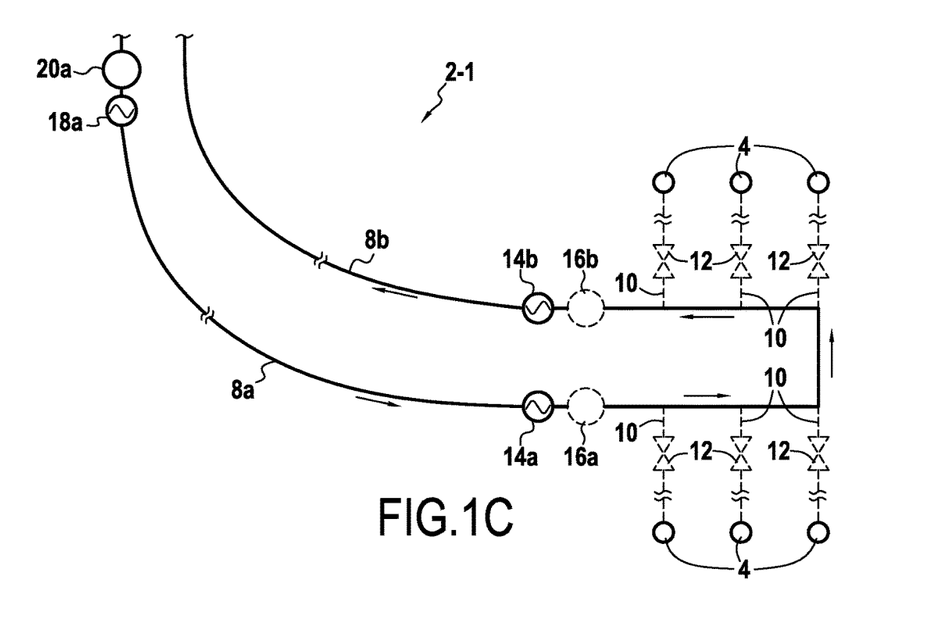

The invention applies to any network of undersea pipes providing a connection between at least one undersea hydrocarbon production well and a surface installation such as the network 2-1 shown in FIGS. 1A to 1C.

Such a network 2-1 is intended to transport hydrocarbons (oil and gas) coming from one or more undersea production wells 4 in order to take them to a surface installation 6 that may be constituted, as shown in FIG. 1A, by a floating production, storage, and off-loading (FPSO) unit. Alternatively, the hydrocarbons coming from production wells 4 may be taken directly to a coastal surface installation by using very long pipes.

In the first embodiment shown in FIGS. 1A to 1C, the network 2-1 comprises two main undersea pipes 8a and 8b each of which is connected to the surface installation 6, and which are connected together at the bottom of the sea so as to form a fluid circulation loop (referred to as a conventional loop network). By way of example, the total length of these two main pipes may be as much 160 km.

The network 2-1 also has a plurality of secondary undersea pipes 10 (there being six in the example shown), each serving to connect an undersea production well 4 to the two main pipes 8a and 8b. Each of these secondary pipes 10 is equipped with a valve 12 controlled directly from the surface installation 6.

The method of the invention consists in ensuring local heating of the fluid transported in the main pipes 8a, 8b of the network 2-1 as described above in order to keep the transported fluids at a temperature higher than a critical threshold so as to avoid deposits forming inside said pipes.

To this end, the method provides for releasably connecting at least one fluid heater station to an undersea pipe and controlling said heater station as a function of the mode of operation of the pipe network.

Thus, in the first embodiment shown in FIGS. 1A to 1C, each main pipe 8a, 8b is equipped with at least one transported fluid heater station 14a, 14b, these heater stations being controlled from the surface installation 6, and each of them may possibly be coupled to a respective pump 16a, 16b.

The operation of the heater stations 14a, 14b is not described in detail herein. By way of example, recourse may be had to heater stations operating on the principle of electromagnetic induction by means of a solenoid that is electrically powered from the surface installation and that is wound around the corresponding pipe in order to heat it by induction and consequently heat the transported fluids by conduction. Alternatively, the heater stations may operate on the microwave principle, by chemical reactions, or by any other known method for heating any type of fluid flowing in an undersea pipe.

Preferably, the heater stations 14a and 14b occupy little ground area and can easily be moved on the network as a function of specific needs for heating. Furthermore, these heater stations can easily be connected to existing networks.

In addition, it should be observed that one of the main pipes (specifically in this example the pipe 8a) has a second heater station 18a at the surface (coupled to a pump 20a) that is connected to the end of the pipe immediately below the surface of the sea.

With reference to FIGS. 1A to 1C, there follows a description of how the heater stations 14a, 14b, and 18a of the network 2-1 are controlled in accordance with the invention as a function of different operating stages of the network.

FIG. 1A shows a normal (or "operational") operating stage of the pipe network, which consists in heating the main pipes 8a and 8b locally so as to maintain a fluid temperature at all points along the pipe above a predetermined temperature threshold.

During this normal operation stage, the heater stations 14a and 14b (and their associated pumps 16a and 16b) are activated continuously (in contrast the heater station 18a may be deactivated, as represented by dashed lines in the figure).

It may be observed that just two heater stations suitably positioned on the network may suffice to maintain a fluid temperature that is high enough over a very great length, e.g. over a total length of the main pipes that may be as much as 160 km.

FIG. 1B shows a stage of preserving the undersea pipe network 2-1. This preservation stage is a stage during which the flow of fluids is interrupted, e.g. in order to perform a maintenance operation on the network.

During such a stage, the fluids situated out of range of the heater stations 14a, 14b, and 18a are no longer heated, and so they cool progressively, with this running the risk of deposits being formed in the main pipes.

Thus, in the preservation stage, the method of managing the heating of fluids makes provision to interrupt the arrival of fluids coming from the production wells 4 by closing the secondary pipes 10 (by closing the valves 12) while keeping the heater stations 14a and 14b active and injecting a processed fluid that does not freeze when cold, typically gasoil.

For this purpose, the pumps 16a and 16b associated with the heater stations 14a and 14b are stopped, and the processed fluid is injected from a tank in the surface installation via the main pipe 8a by actuating the pump 20a associated with the surface heater station 18a (which is deactivated). This processed fluid purges the main pipes of all of the fluids therein by expelling these fluids to the surface installation via the main pipe 8b.

The processed fluid thus fills the circulation loop formed by the main pipes 8a and 8b. Once this circulation loop is filled with the processed fluid, the heater stations 14a and 14b can be stopped (there being no need to heat the processed fluid since it does not freeze when cold).

FIG. 1C shows a stage of restarting the undersea pipe network 2-1. This restarting stage typically follows a preservation stage as described above.

During this restarting stage, the method of managing the heating of fluids comprises reactivating all of the heater stations 14a, 14b, and 18a (i.e. including the surface heater station 18a), while the secondary pipes 10 are kept closed. The heater stations thus serve to heat the processed fluid flowing around the circulation loop so as to heat the main pipes 8a and 8b. Once these pipes are heated, the secondary pipes 10 are opened progressively (by opening the valve 12) so as to enable production to restart.

With reference to FIGS. 2A to 2D, there follows a description of an architecture for an undersea pipe network 2-2 in a second embodiment of the invention that is referred to as a "two" loop embodiment.

This pipe network 2-2 differs from that described above in particular in that it further comprises two connection pipes 22 and 24 that enable the two main pipes 8a and 8b to be connected together downstream from the heater stations 14a and 14b (where "upstream" and "downstream" are used herein relative to the flow direction of the fluid in the network during a stage of normal operation).

The pipe network 2-2 also has valves 26a and 26b positioned on the main pipes 8a and 8b between the two connection pipes 22 and 24, and a service pipe 28 connecting the surface installation (not shown in the figures) to the connection pipe 22 that is further upstream.

In a normal operation stage of the pipe network 2-2 (FIG. 2A), the method of the invention provides for locally heating the fluids flowing in the main pipes 8a and 8b so as to maintain a fluid temperature at all points in the pipes that is above a predetermined temperature threshold.

Figures 2A, 2B, 2C:
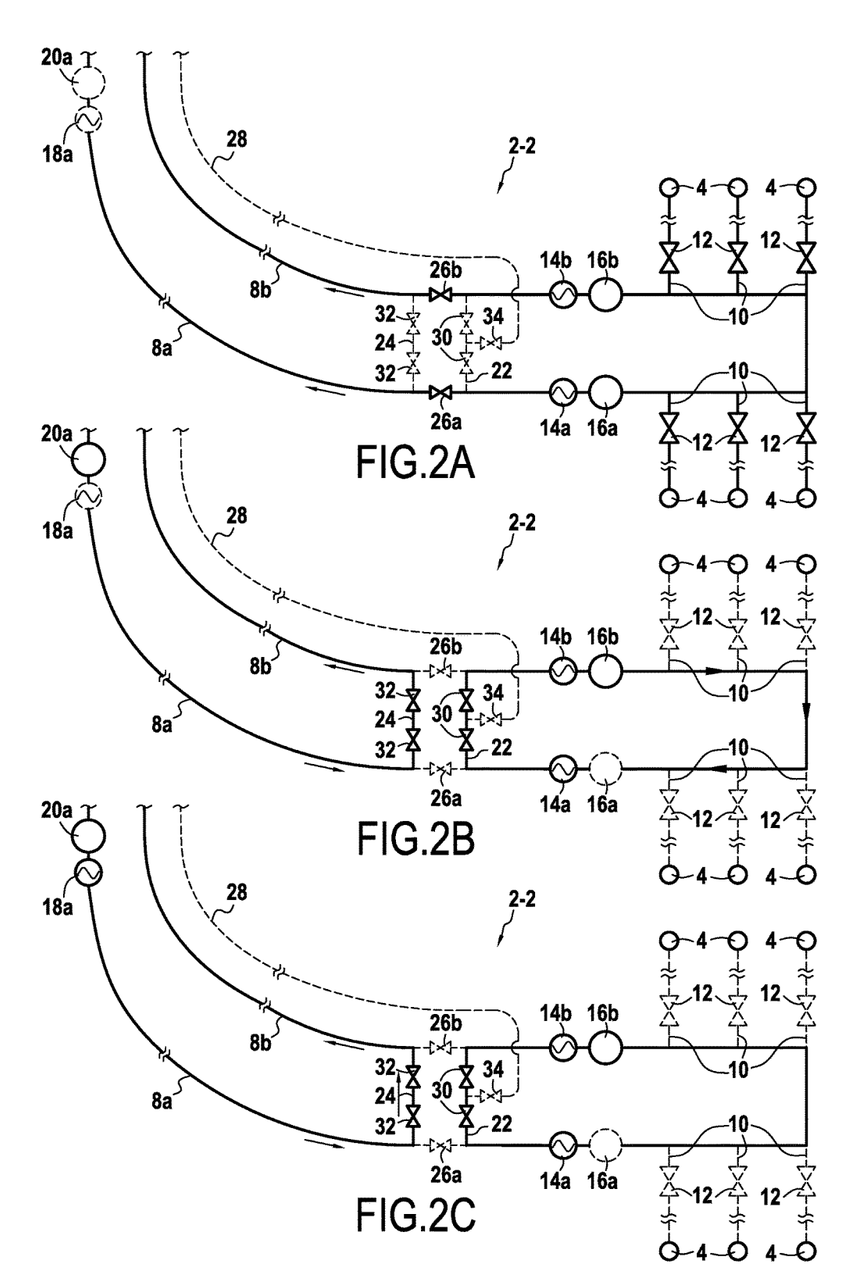
FIGS. 2A to 2D are diagrammatic views of an implementation of the method of the invention in a "two" loop second embodiment.

During this stage of normal operation, the heater stations 14a and 14b (and their associated pumps 16a and 16b) are thus activated continuously (while, in contrast, the heater station 18a is deactivated). Furthermore, the connection pipes 22 and 24 are closed (by closing the valves 30 and 32 positioned on these pipes), as is the service pipe 28.

In a preservation stage of the pipe network 2-2 (FIG. 2B), the method makes provision initially for closing the secondary pipes 10 (by closing the valves 12) and for closing the main pipes 8a and 8b between the connection pipes 22 and 24 (by closing the valves 26a and 26b).

In parallel, the connection pipes 22 and 24 are opened (by opening the valves 30 and 32) and the service pipe 28 remains closed. Thus, the main pipes of the network 2-2 form two circulation loops for the transported fluids, namely an upstream circulation loop upstream from the upstream connection pipe 22, and a downstream circulation loop downstream from the downstream connection pipe 24.

Furthermore, the heater stations 14a and 14b are kept activated so as to keep the temperature of the fluids above a predetermined temperature threshold at all points in the upstream fluid circulation loop. The fluids in this upstream loop are caused to circulate by actuating only one of the pumps associated with the heater stations (in this example the pump 16b).

Thereafter, processed fluid that does not freeze when cold (e.g. gasoil) is injected into the main pipes from a tank in the surface installation via the main pipe 8a by actuating the pump 20a associated with the surface heater station 18a (which is itself deactivated). This processed fluid purges the downstream fluid circulation loop of all the fluids therein by expelling these fluids to the surface installation via the main pipe 8b.

Thus, during this preservation stage, any risk of deposits forming in the main pipes can be dismissed: in the upstream fluid circulation loop by activating the heater stations 14a and 14b, and in the downstream loop by the presence of a processed fluid that does not freeze when cold.

Figure 2D:
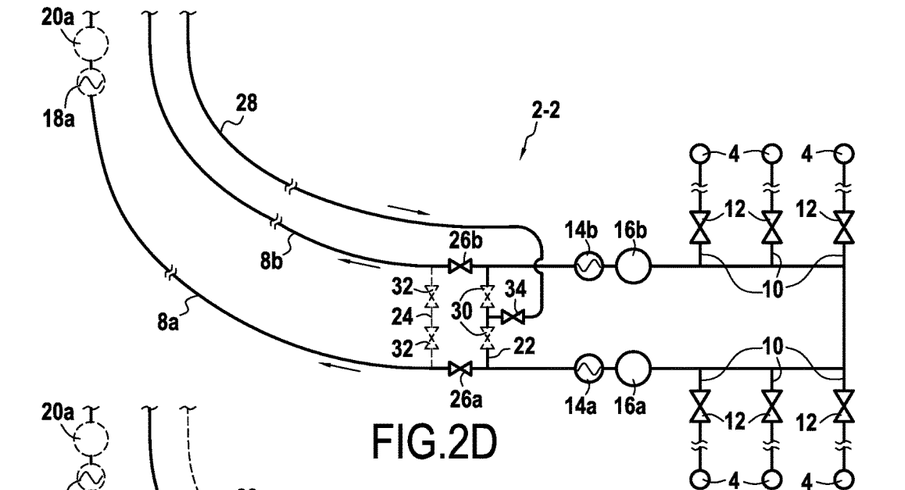

FIGS. 2C and 2D show the same pipe network 2-2 during a restarting stage following a preservation stage as described above.

During this restarting stage, the method of managing the heating of the fluids comprises initially (FIG. 2C) activating the surface heater station 18a so as to heat the processed fluid, which in turn heats the main pipes in the downstream fluid circulation loop. The fluids circulating in the upstream loop continue to be heated by the other heater stations 14a and 14b.

Thereafter (FIG. 2D), when the main pipes in the downstream fluid circulation loop are hot enough, provision is made to stop injecting the processed fluid into the main pipes 8a and 8b in the downstream fluid circulation loop. The main pipes 8a and 8b are then reopened (by opening the valves 16a and 16b), while the connection pipes 22 and 24 are closed so as to merge the upstream and downstream fluid circulation loops. The secondary pipes 10 can then be progressively opened (by opening the valves 12) so as to enable production to restart.

Finally, a fluid (typically methanol) is injected via the service pipe 28 into the upstream connection pipe 22 (by opening a control valve 34) in order to avoid hydrates forming in this connection pipe.

With reference to FIGS. 3A to 3D, there follows a description of an architecture for an undersea pipe network 2-3 in a third embodiment of the invention that is likewise "two" loop embodiment.

This pipe network 2-3 differs from the above-described network in particular in that the service pipe 28 is connected to both connection pipes, namely the upstream connection pipe 22 and the downstream connection 24.

The method of managing heating such a pipe network 2-3 is similar to that described for the network of FIGS. 2A to 2D.

In particular, in a normal operation stage (FIG. 3A), the method of the invention provides for heating the main pipes 8a and 8b locally so as to maintain a temperature of the fluid at all points therein that is above a predetermined temperature threshold.

Figure 3A:
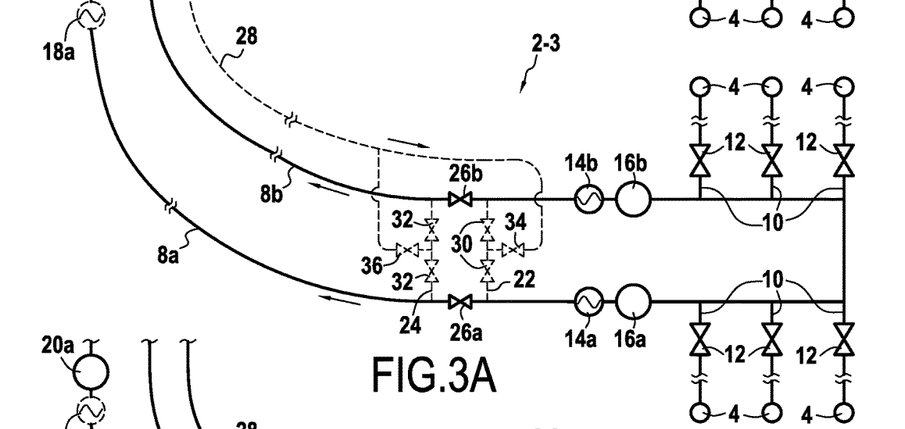
FIGS. 3A to 3D are diagrammatic views of an implementation of the method of the invention in a "two" loop third embodiment.

During this normal operation stage, the heater stations 14a and 14b (and their associated pumps 16a and 16b) are activated continuously while the connection pipes 22 and 24 are closed, as is the service pipe 28.

During the preservation stage (FIG. 3B), the method makes provision for closing the secondary pipes 10 and also the main pipes 8a and 8b between the connection pipes 22 and 24, while the connection pipes are opened (by opening the valves 30 and 32) so that the main pipes form two circulation loops for the transported fluid.

Figure 3B:
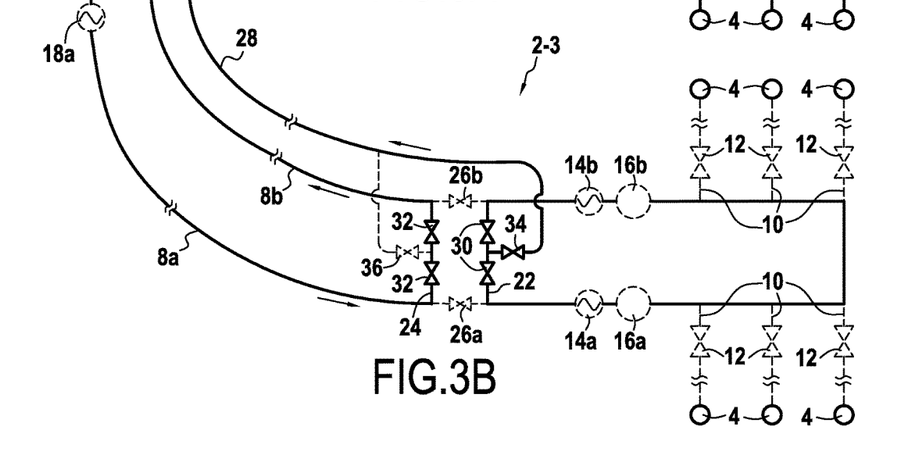
Figure 3C:
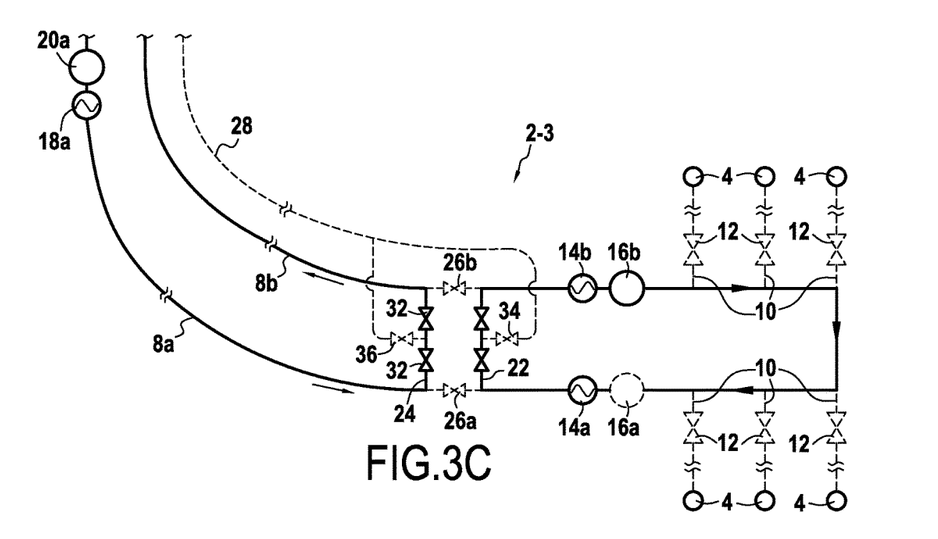

Compared with the embodiment described with reference to FIG. 2B, the method further comprises deactivating the heater stations 14a and 14b and depressurizing the upstream fluid circulation loop by opening the valve 34 of the service pipe 28. The purpose of this depressurization is to avoid hydrates forming in the pipes of the upstream fluid circulation loop.

Furthermore, a processed fluid that does not freeze when cold is injected into the main pipes from a tank of the surface installation via the main pipe 8a by actuating the pump 20a associated with the surface heater station 18a (which remains deactivated). This processed fluid purges the downstream fluid circulation loop of all of its fluids by expelling the fluids to the surface installation via the main pipe 8b.

Thus, during this preservation stage, any risk of deposits forming in the main pipes can be dismissed: in the upstream fluid circulation loop by depressurization, and in the downstream loop by the presence of a processed fluid that does not freeze when cold.

The restarting stage following a preservation stage is likewise similar to that described with reference to FIGS. 2C and 2D.

In particular, the method of managing the heating of the fluids comprises, initially (FIG. 3C), activating the surface heater station 18a so as to heat the processed fluid that in turn heats the main pipes in the downstream fluid circulation loop. The other heater stations 14a and 14b are also reactivated to heat the fluids circulating in the upstream loop, and depressurization of the upstream loop is stopped (by closing the valve 34 in the service pipe 28).

Figure 3D:
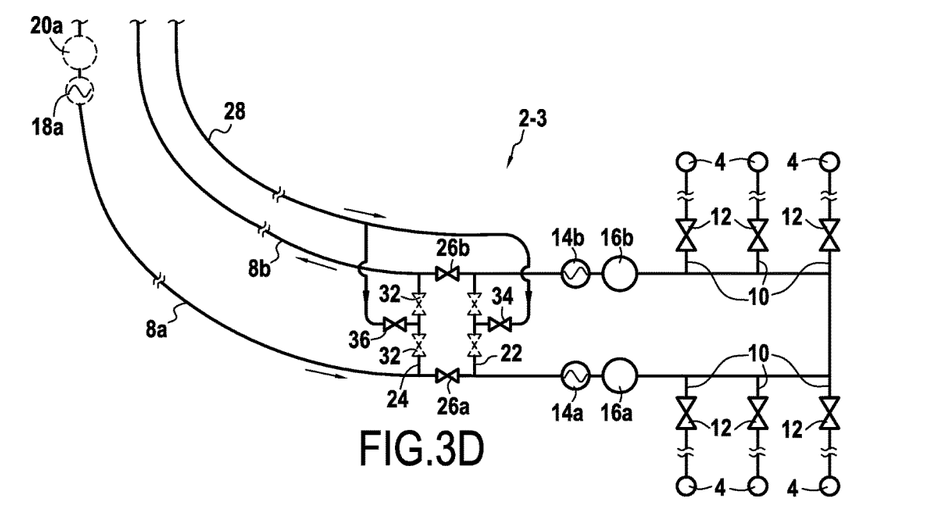

Once the main pipes in the downstream fluid circulation loop are hot, injection of the processed fluid into the main pipes 8a and 8b in the downstream fluid circulation loop is stopped (FIG. 3D). The main pipes 8a and 8b are then reopened, while the connection pipes 22 and 24 are closed so as to merge the upstream and downstream fluid circulation loops. The secondary pipes 10 can then be opened progressively (by opening the valves 12) so as to enable production to restart.

Finally, a fluid (typically methanol) is injected via the service pipe 28 both into the upstream connection pipe 22 (by opening the control valve 34), and in the downstream connection pipe 24 (by opening a control valve 36) so as to avoid hydrates forming in these connection pipes.

With reference to FIGS. 4A to 4D, there follows a description of an architecture for an undersea pipe network 2-4 in a fourth embodiment of the invention which is likewise a "two" loop embodiment.

This pipe network 2-4 differs from the above-described network in particular in that the service pipe 28 is connected to two additional connection pipes 38 and 40 positioned downstream from the connection pipes 22 and 24 and connecting together the main pipes 8a and 8b.

The pipe network 2-4 also has additional heater stations 42a and 42b (with their respective pumps 44a and 44b) that are respectively connected to the main pipes 8a and 8b between the connection pipes 22, 24 and the additional connection pipes 38, 40.

The pipe network 2-4 also has valves 46a, 46b positioned on the main pipes 8a, 8b between the two additional connection pipes 38 and 40.

The method of managing the heating of such a pipe network 2-4 is as follows.

In a normal operation stage (FIG. 4A), the method provides for locally heating the main pipes 8a and 8b so as to maintain the fluids at all points therein at a temperature higher than a predetermined temperature threshold.

Figure 4A:
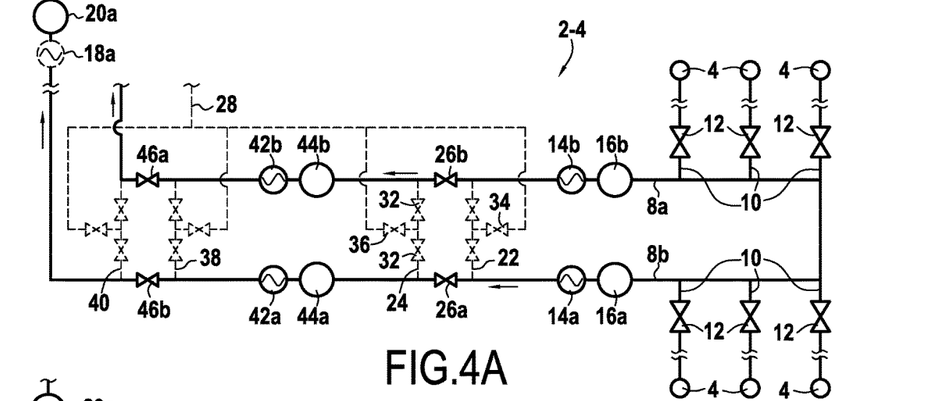
FIGS. 4A to 4D are diagrammatic views of an implementation of the method of the invention in a "two" loop fourth embodiment.

During this normal operation stage, the heater stations 14a and 14b (and their associated pumps 16a and 16b), and also the additional heater stations 42a and 42b (with their respective pumps 44a and 44b) are activated continuously and the connection pipes 22, 24, 38, and 40 are closed, as is the service pipe 28. Thus, the main pipes 8a and 8b are locally heated so as to maintain the fluids at all points therein at a temperature higher than a predetermined temperature threshold.

During a preservation stage (FIG. 4B), the method makes provision for closing the secondary pipes 10 (by closing the valves 12) and also the main pipes 8a and 8b both between the connection pipes 22, 24 (by closing the valves 26a, 26b) and between the additional connection pipes 38, 40 (by closing the valves 46a, 46b).

Figure 4B:
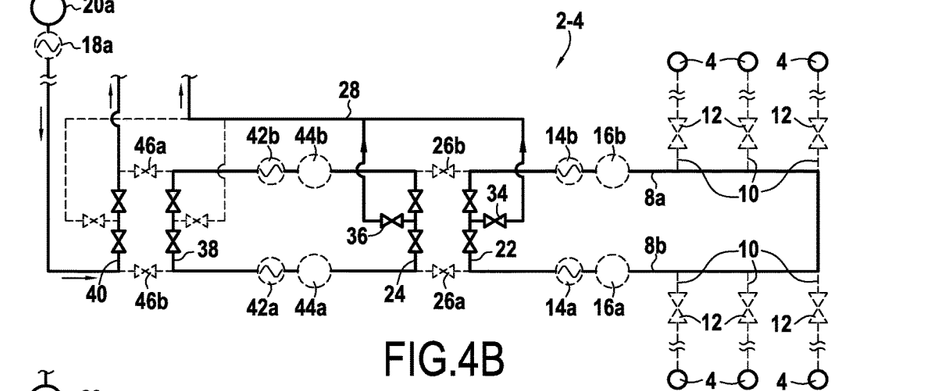
Figure 4C:
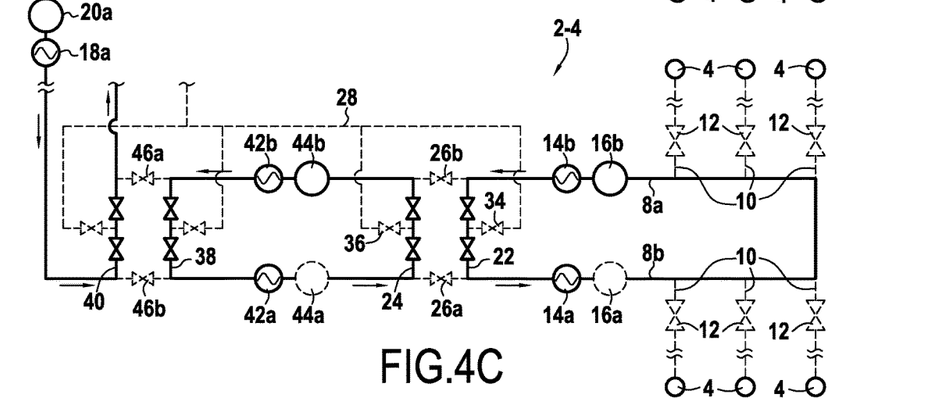

In contrast, the connection pipes 22, 24, 38, and 40 are opened so that the main pipes form two transported fluid circulation loops (an upstream loop upstream from the upstream connection pipe 22, and a downstream circulation loop between the downstream connection pipe 24 and the additional connection pipe 38).

The heater stations 14a and 14b and the additional heater stations 42a and 42b are deactivated (as are their associated pumps), and the upstream and downstream pumps are depressurized by opening the valves 34 and 36 of the service pipe 28. The purpose of this depressurization is to avoid hydrates forming in the pipes of the upstream and downstream fluid circulation loops.

A processed fluid that does not freeze when cold is also injected into the main pipes from a tank of the surface installation via the main pipe 8*a* by actuating the pump 20*a* associated with the surface heater station 18*a* (which remains deactivated). This processed fluid serves to purge all fluids from the fluid circulation loop (referred to as the "riser" loop) that is situated downstream from the downstream loop by expelling those fluids to the surface installation via the main pipe 8*b*.

Thus, during this preservation stage, any risk of deposits forming in the main pipes can be dismissed: in the upstream and downstream fluid circulation loops by depressurization, and in the riser loop by the presence of a processed fluid that does not freeze when cold.

The restarting stage following a preservation stage takes place as follows.

The method of managing the heating of the fluids initially comprises (FIG. 4C), activating the surface heater station 18*a* so as to heat the processed fluid, which in turn heats the main pipes in the riser loop. The heater stations 14*a*, 14*b* and 42*a*, 42*b* are also reactivated so as to heat the fluids flowing in the upstream and downstream fluid circulation loops. Depressurization of the upstream and downstream loops is stopped (by closing the valves 34 and 36 of the service pipe 28).

Figure 4D:
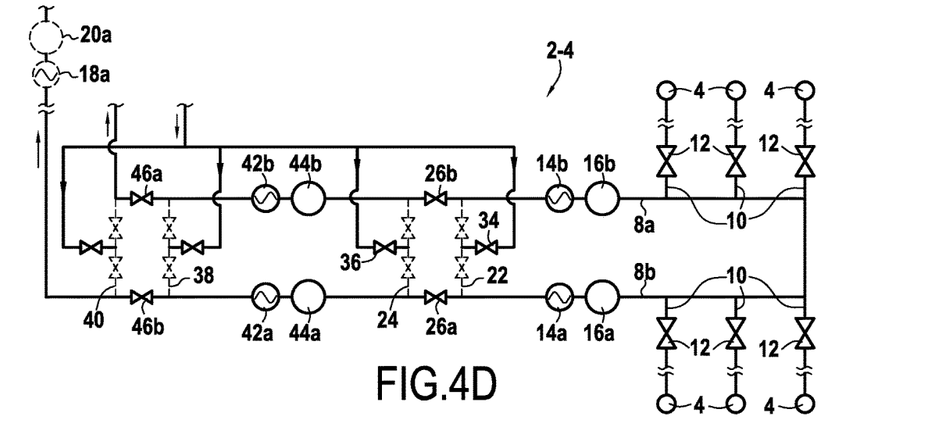

Once the main pipes 8*a* and 8*b* are hot, injection of the processed fluid into the riser loop is stopped (FIG. 4D). The main pipes 8*a* and 8*b* are then reopened, while the connection pipes 22, 24 and 38, 40 are closed so as to merge together the upstream and downstream fluid circulation loops and the riser loop. The secondary pipes 10 can then be opened progressively (by opening the valves 12) so as to enable production to restart.

Finally, a fluid (typically methanol) is injected by the service pipe 28 into the connection pipes 22, 24 and 38, 40 in order to avoid hydrates forming in these pipes.

Figure 5:
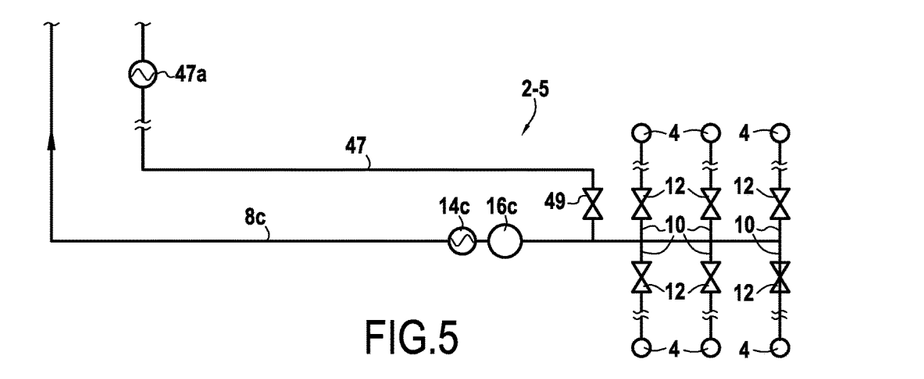
FIG. 5 is a diagrammatic view of an implementation of the method of the invention in a "hybrid" loop fifth embodiment.

With reference to FIG. 5, there follows a description of an architecture for an undersea pipe network 2-5 in a fifth embodiment of the invention referred to as a "hybrid" loop embodiment.

In this embodiment, the network 2-5 has a production pipe 8*c* connected to the surface installation (not shown in FIG. 5), a plurality of secondary pipes 10 connecting production wells 4 to the production pipe, and a service pipe 47 connected to the production pipe 8*c* downstream from the secondary pipes 10.

Such a network 2-5 can be used for transporting fluids over long distances. Under such circumstances, the method of the invention is similar to those described above, i.e. it includes connecting the production pipe 8*c* to a fluid heater station 14*c* situated downstream from a connection with the service pipe 47.

In a normal operation stage, this heater station 14*c* (and its associated pump 16*c*) is activated to keep the temperature of the fluids above a predetermined temperature threshold at all points in the network (the service pipe 47 being closed by closing a valve 49 provided thereon).

In a preservation stage, the secondary pipes 10 are closed (by closing associated valves 12) and the service pipe 47 is opened. A processed fluid (typically gasoil) is injected from the surface installation into the production pipe 8*c* in order to purge it of the fluids that it contains before stopping the heater station 14*c* once the main pipe has been purged.

Finally, in a restarting stage, the processed fluid flowing in the service pipe 47 is heated by a conventional heater system 47*a* (situated in the surface installation) so as to heat the production pipe 8*c* by transmission. When the pipe is hot enough, injection of the processed fluid is stopped and the secondary pipes 10 are opened progressively (by opening the valves 12) so as to enable production to restart.

Alternatively, the undersea pipe network 2-5 in the fifth embodiment may be used for heating the bottom of the "riser" (i.e. the bottom of a pipe used for connecting the sea bottom to the surface installation). Under such circumstances, the heater station 14*c* is activated only during stages of normal operation.

Also alternatively, the undersea pipe network 2-5 in this fifth embodiment may be used for transporting fluids over distances that are shorter but at very great depth. Under such circumstances, the network also includes another heater station at the bottom of the riser, which heater station is also activated during the preservation stage.

With reference to FIGS. 6 to 9, there follows a description of the various characteristics of heater stations for performing the method of the invention.

These heater stations correspond to those described above in the various embodiments of the undersea pipe networks.

Figure 6:
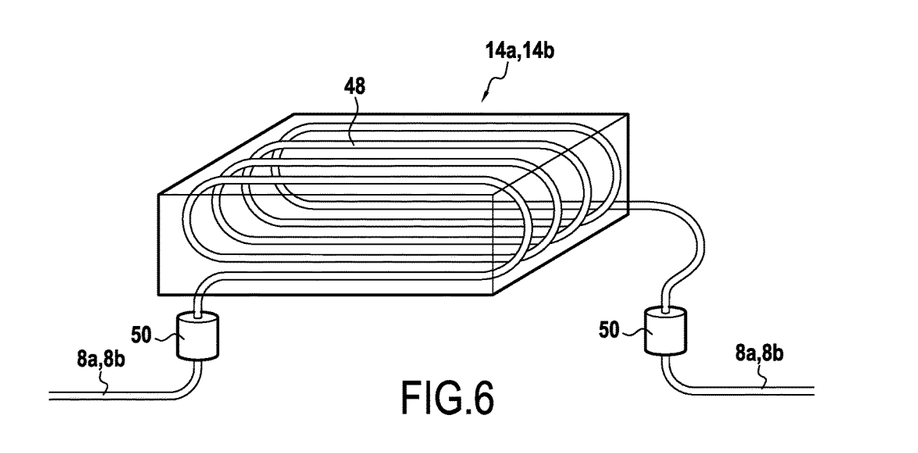
FIGS. 6 to 9 show various characteristics of heater stations for implementing the method of the invention.

As shown in FIG. 6, the heater station 14*a*, 14*b* may comprise a pipe 48 that is wound in coils inside the heater station and that is heated (e.g. by electromagnetic induction). The ground area occupied by such heater stations is thus small.

In the embodiment of FIG. 6, the heater station 14*a*, 14*b* is connected directly to an undersea pipe 8*a*, 8*b*, e.g. by means of valves 50.

Figure 7:
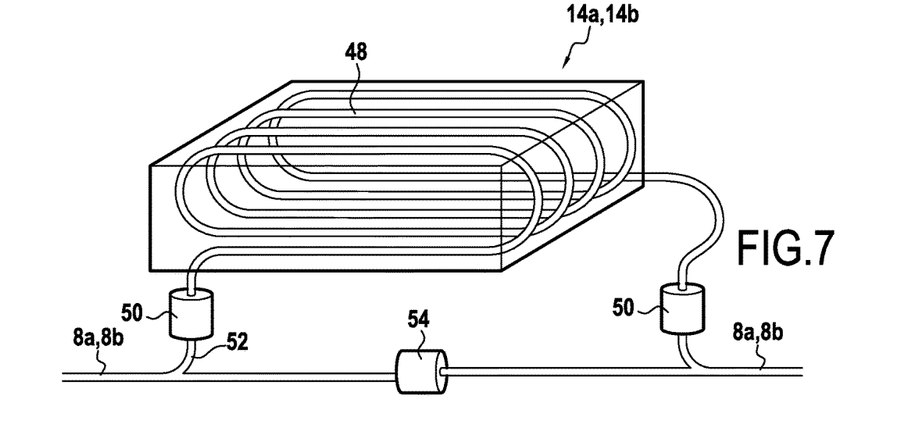

In the embodiment of FIG. 7, the heater station 14*a*, 14*b* is connected to an undersea pipe 8*a*, 8*b* by means of a bypass pipe 52 connected to the corresponding undersea pipe by valves 50. In addition, the undersea pipe is equipped with a bypass valve 54.

Figure 8:
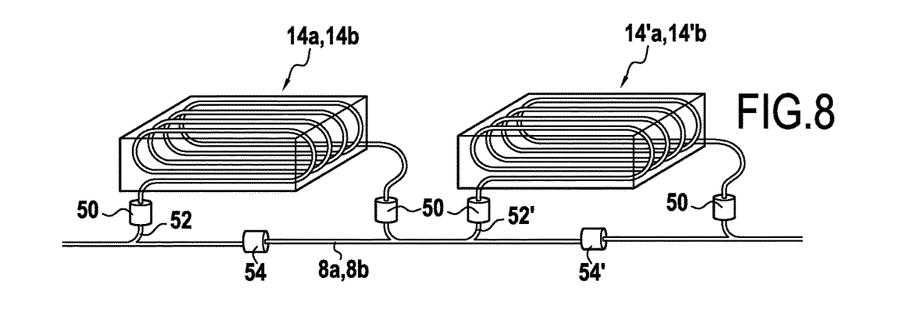

In the embodiment of FIG. 8, the undersea pipe 8*a*, 8*b* is connected to two heater stations 14*a*, 14*b*; 14'*a*, 14'*b* installed in series on the connection principle of FIG. 7 (using bypass pipes 52, 52' and having recourse to bypass valves 54, 54').

This embodiment thus provides heater station redundancy in which each heater station is capable on its own of delivering the desired heating to the transported fluid. Under normal circumstances, only one of the two heater stations is used, or both of them are used at half-power. If one of the heater stations is withdrawn, then the other station takes over.

Figure 9:
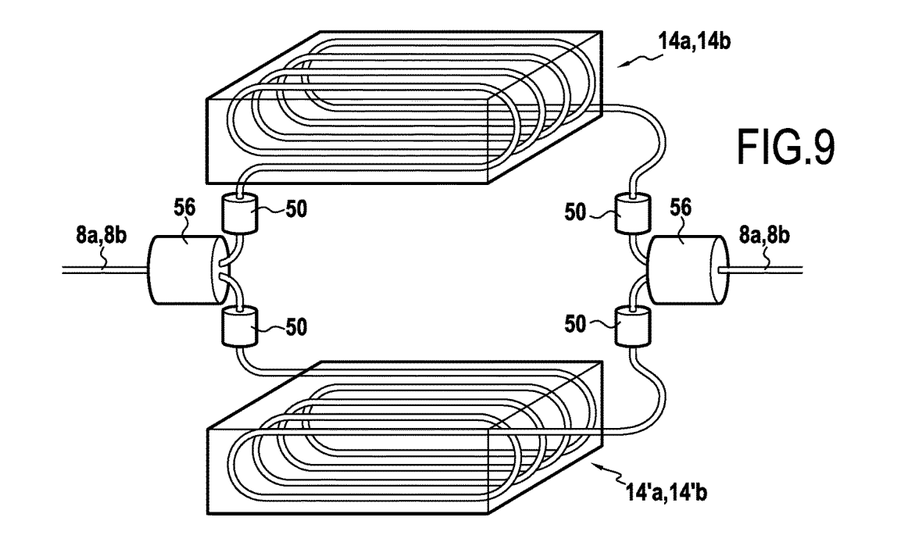

In the variant embodiment of FIG. 9, the undersea pipe 8*a*, 8*b* is connected to two heater stations 14*a*, 14*b*; 14'*a*, 14'*b* that are installed in parallel, with devices 56 being present upstream and downstream from the heater stations for the purpose of directing a scraper for the purpose of scraping any deposits from the walls.

The invention claimed is:

1. A method of managing the heating of fluids flowing in an undersea pipe network providing a connection between a surface installation and at least one undersea production well, wherein the undersea pipe network comprises two main pipes connected together at the sea bottom and each connected to the surface installation so as to form at least one fluid circulation loop; a plurality of secondary pipes connecting production wells to the two secondary pipes; and two connection pipes connecting together the two main pipes downstream from the fluid heater stations, the method comprises:

releasably connecting at least one fluid heater station to an undersea pipe by a bypass pipe connected to the undersea pipe, to selectively direct the fluids flowing in the undersea pipe through the bypass pipe and towards the fluid heater station for heating the so-directed fluids, and for returning the so-heated fluids to the undersea pipe, and controlling the operation of said fluid heater station as a function of a mode of operation of the pipe network;

connecting each main pipe to at least one fluid heater station downstream from the secondary pipes, and activating the fluid heater stations in a stage of normal operation of the pipe network to maintain the fluids at all points of the network at a temperature higher than a predetermined temperature threshold; and in a preservation stage of the undersea pipe network:
closing the secondary pipes and the main pipes between the two connection pipes while opening the connection pipes, and activating the heater stations to maintain the fluids at all points in an upstream fluid circulation loop at a temperature higher than a predetermined temperature threshold; and injecting a processed fluid into the main pipes of a downstream fluid circulation loop to purge the fluids it contains.

2. The method according to claim 1, wherein, in a stage of restarting the pipe network following a preservation stage, the method comprises reactivating the fluid heater stations while keeping closed the secondary pipes so as to heat the main pipes, and subsequently reopening the secondary pipes progressively in order to restart production.

3. The method according to claim 1, wherein, in a stage of restarting the undersea pipe network following a preservation stage, the method comprises:
stopping injection of a processed fluid into the main pipes of the downstream fluid circulation loop;
reopening the main pipes between the connection pipes;
closing the two connection pipes so as to merge together the upstream and downstream fluid circulation loops;
injecting methanol into at least one of the connection pipes in order to prevent hydrates forming therein; and
reopening the secondary pipes progressively in order to restart production.

4. The method according to claim 1, wherein, in a stage of preserving the undersea pipe network, the method comprises stopping the fluid heater stations and depressurizing the upstream fluid circulation loop in order to avoid hydrates forming in the upstream loop.

5. The method according to claim 1, wherein the undersea pipe network comprises:
a production pipe connected to the surface installation;
a plurality of secondary pipes connecting production wells to the production pipe; and
a service pipe connected to the production pipe downstream from the secondary pipes;
the method further comprising connecting the production pipe to at least one fluid heater station downstream from a connection with the service pipe, and activating the fluid heater station in a stage of normal operation of the pipe network in order to maintain the fluids at all points in the network at a temperature higher than a predetermined temperature threshold.

6. The method according to claim 1, wherein at least one of the undersea pipes is connected to at least two fluid heater stations installed in series or in parallel.

* * * * *